United States Patent [19]

Yamauchi et al.

[11] Patent Number: 5,125,452
[45] Date of Patent: Jun. 30, 1992

[54] ALUMINUM ALLOY CLAD MATERIAL

[75] Inventors: Shigenori Yamauchi, Aichi; Yuji Suzuki; Kenji Kato, both of Nagoya, all of Japan

[73] Assignees: Sumitomo Light Metal Industries, Ltd., Tokyo; Nippondenso Co., Ltd., Kariya, both of Japan

[21] Appl. No.: 674,559

[22] Filed: Mar. 22, 1991

[30] Foreign Application Priority Data

Sep. 18, 1990 [JP] Japan ................... 2-246268

[51] Int. Cl.$^5$ ............ F28F 21/08; B32B 15/20
[52] U.S. Cl. ................ 165/133; 165/134.1; 165/153; 165/180; 165/905; 428/610; 428/654
[58] Field of Search .......... 428/654, 610, 933; 165/180, 905, 134.1, 133, 153

[56] References Cited

U.S. PATENT DOCUMENTS

| | | | |
|---|---|---|---|
| 3,843,333 | 10/1974 | Woods | 428/654 |
| 4,209,059 | 6/1980 | Anthony | 165/180 |
| 4,317,484 | 3/1982 | Tanabe et al. | 165/180 |
| 4,357,397 | 11/1982 | Baba et al. | 428/654 |
| 4,511,632 | 4/1985 | Toma et al. | 428/654 |
| 4,560,625 | 12/1985 | Kaifu et al. | 428/654 |
| 4,649,087 | 3/1987 | Scott et al. | 428/654 |
| 4,727,001 | 2/1988 | Takemoto et al. | 428/654 |
| 4,828,936 | 5/1989 | Toma et al. | 428/654 |

FOREIGN PATENT DOCUMENTS

| | | | |
|---|---|---|---|
| 58-110653 | 7/1983 | Japan | 428/654 |
| 58-156197 | 9/1983 | Japan | 165/905 |
| 59-116353 | 7/1984 | Japan | 428/654 |
| 59-150052 | 8/1984 | Japan | 428/654 |
| 60-138037 | 7/1985 | Japan | 428/654 |
| 60-138083 | 7/1985 | Japan | 428/654 |
| 62-96637 | 5/1987 | Japan | . |
| 62-230494 | 10/1987 | Japan | . |
| 62-280343 | 12/1987 | Japan | . |
| 63-241133 | 10/1988 | Japan | . |
| 2-258945 | 10/1990 | Japan | . |

*Primary Examiner*—John Zimmerman
*Attorney, Agent, or Firm*—Flynn, Thiel, Boutell & Tanis

[57] ABSTRACT

Disclosed is an aluminum alloy clad material and a heat exchanger using the clad material, the clad material being composed of: (a) a core material made of an aluminum alloy consisting essentially of, in weight percentage, 0.3 to 1.5% manganese, 0.05 to 0.35% copper, 0.05 to 0.50% magnesium, 0.06 to 0.35% titanium, less than 0.1% silicon and up to 0.3% iron, the copper content being related to the magnesium content in accordance with the following equation: $Cu(\%) - 0.2 \leq Mg(\%) \leq Cu(\%) + 0.2$, the balance being aluminum and incidental impurities; and (b) a cladding material made of an Si-containing aluminum alloy brazing filler material clad onto at one or both sides of the core material. The aluminum alloy clad material is superior in press formability, corrosion resistance and brazability. Particularly, when the percentage of fine Mn compounds of 0.1 $\mu$m or less and the Ti content variation in the core material are controlled, further improved properties can be obtained.

4 Claims, 3 Drawing Sheets

ENLARGED PORTION A

ALUMINUM ALLOY CLAD MATERIAL

BACKGROUND OF THE INVENTION

1. Field of the Invention

The present invention relates to an aluminum alloy clad material (brazing sheet) which is especially, although not exclusively, suitable for use as a drawn-cup type heat exchanger core plate and, more particularly, to an aluminum alloy clad material (brazing sheet) which not only has a high level of press formability and pitting corrosion resistance, but also is improved in brazability by preventing the erosion attack of a liquid brazing filler metal into a core material at a brazing temperature.

The present invention is also directed to a heat exchanger including tubes made of the above-mentioned aluminum alloy clad material having a high resistance to corrosion and a long service life.

2. Description of the Related Art

Heretofore, aluminum alloy heat exchangers have been employed in oil coolers, intercoolers and heaters for automobiles; evaporators and condensers for air conditioners; oil coolers for hydraulic equipment and industrial machines; or the like.

Figure 1:
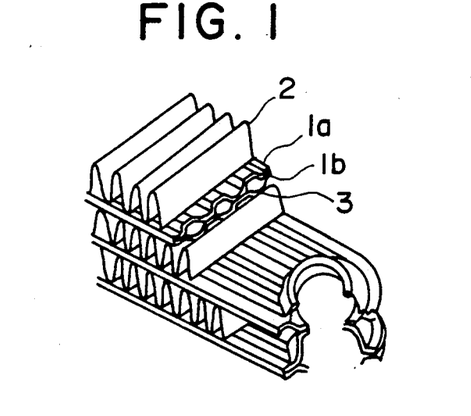
FIG. 1 is a perspective view of a drawn-cup type evaporator.
Figure 2:
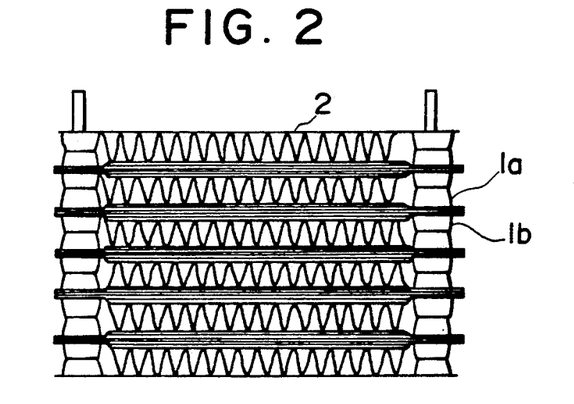
FIG. 2 is a plan view thereof.

An aluminum alloy heat exchanger has been fabricated by stacking aluminum alloy clad sheets (brazing sheets), which have been formed to a desired configuration, so as to form fluid passages and securing corrugated aluminum alloy fins between the fluid passages by brazing. For example, in the fabrication of a drawn-cup type evaporator, core plates 1a and 1b made of a press-formed (stamped) aluminum alloy clad material (i.e., brazing sheet clad on both sides with a brazing filler material) and corrugated aluminum alloy fin material 2 are stacked as shown in FIGS. 1 and 2. The bonding of the core plates and fins thus stacked is achieved by melting the brazing filler metal of the core plates. In such a brazing procedure, coolant fluid passages 3 are formed between the core plates 1a and 1b.

The core plate has been constituted by a clad material (brazing sheet) in which Mn containing aluminum alloys, such as Al-Mn alloy, Al-Mn-Cu alloy, Al-Mn-Mg alloy, Al-Mn-Cu-Mg alloy, etc., more specifically, alloys designated by the Japanese Standard Association (JIS) as 3003 alloy, 3005 alloy and so forth, have been used as the core material and the core material has been clad on one or both sides thereof with a brazing filler material of an Al-Si alloy or other similar Al-Si system alloy, such as Al-Si-Mg alloy, Al-Si-Mg-Bi alloy, Al-Si-Mg-Be alloy, Al-Si-Bi alloy, Al-Si-Be alloy, Al-Si-Bi-Be or the like. An aluminum alloy, for example, Al-Mn alloy, Al-Mn-Mg alloy, Al-Mn-Cu alloy or Al-Mn-Zn alloy has been used as he fin material.

As a brazing method, vacuum brazing is typically used but flux brazing using a chloride flux, fluoride flux and so forth have been also employed.

As set forth above, in the brazing sheet heretofore used for the fabrication of an aluminum alloy core plate, Mn-containing aluminum alloys, such as 3003 alloy or 3005 alloy, have been used as the core material. However, when these known alloy materials are used in the coolant fluid passages, pitting corrosion occurs from the outer surface due to the inadequate pitting corrosion resistance of these materials, thereby causing perforation and leakage problems.

In an effort to improve the pitting corrosion resistance of the fluid passage materials, some fin materials, for example, Al-Mn-Zn alloy, Al-Mn-Sn alloy and so forth, which are electrochemically anodic (less noble) relative to the fluid passage material, have been studied with a view of preventing the corrosion of the fluid passages by the sacrificial anode effect of these fin materials. However, while the sacrificial anode effect of such fin materials is effectively obtained in the vicinity of the brazed joint sections of the fins and the fluid passages, in other places away from the joint sections, the sacrificial anode effect of the fins does not occur. Consequently, pitting corrosion occurs.

Figure 5:
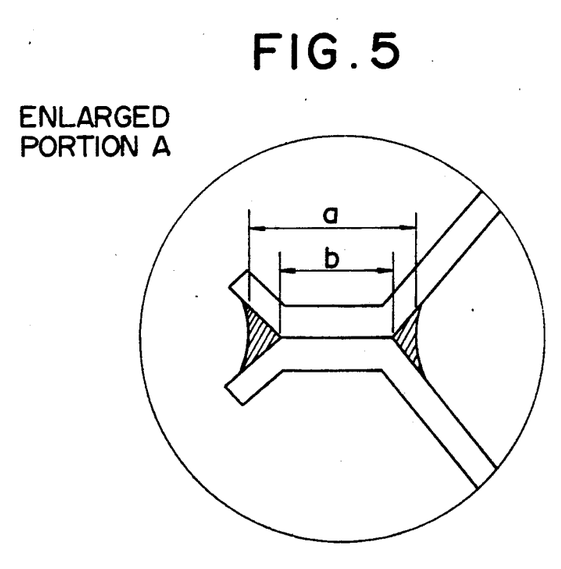
FIG. 5 is an enlarged view of Portion A shown in FIG. 4.
Figure 6A:
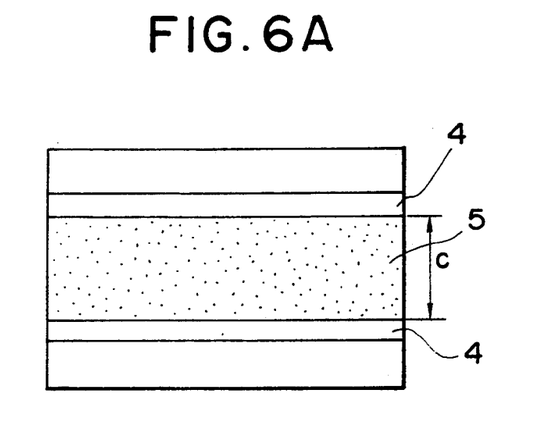
FIG. 6A shows a brazing sheet structure before brazing.
Figure 6B:
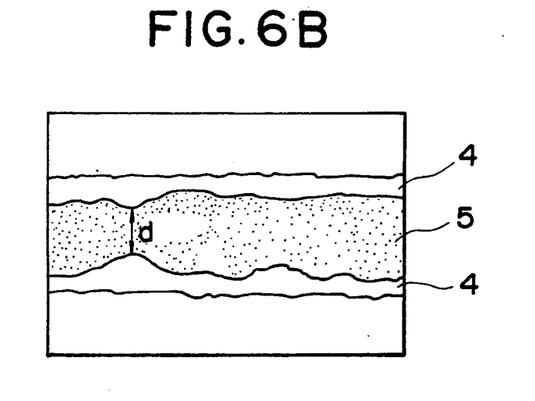
FIG. 6B is a view illustrating the state of erosion in a core caused by attack of a liquid brazing filler metal.

Further, during the brazing operation, a liquid brazing filler metal 4, 4 of the aluminum alloy clad material (brazing sheet), as shown in FIG. 6A, attacks or erodes the core material 5 (maximum erosion depth $=c-d$), as shown in FIG. 6B, and the amount of the brazing filler metal at the joint section becomes inadequate. As a result, the thickness $(a-b)$ of the brazed fillet section, as shown in FIG. 5, is reduced and problems, such as reduction of the fillet strength or burst pressure of a heat exchanger or deterioration of the corrosion resistance in the eroded part of the core material, arise.

In order to eliminate such problems, the instant inventors have developed an aluminum alloy clad material for a drawn-cup type heat exchanger core plate in which the core material of the clad material is made of an Al-Mn aluminum alloy with the addition of Cu, Mg, Ti and Si and the Al-Mn alloy core material has a controlled relationship between the particle size and the amount of Mn compounds and has a periodically varying Ti content along its thickness. inventors' aluminum alloy clad material has been disclosed in Japanese Patent Application No. 1 - 76 776.

While a sufficient improvement in corrosion resistance is obtained in the previous inventors' clad material, there is the technical problem that cracking tends to occur in the core plate during the press-forming process.

SUMMARY OF THE INVENTION

Accordingly, an object of the present invention is to provide an aluminum alloy clad material having a superior combination of press formability, corrosion resistance and brazability, thereby eliminating the above-mentioned problems.

It is a further object of the present invention to provide a heat exchanger having a high resistance to erosion corrosion and a long useful life in service.

In order to overcome the above-mentioned problems, the present inventors have made many studies and arrived at the finding that the corrosion resistance of an Al-Mn core alloy is greatly improved when the following conditions are satisfied. Namely, Cu and Mg are coexistent therein within carefully controlled amounts; the alloy structure has a Ti content periodically varying along the thickness within average content ranges of 0.06 to 0.35%; and Si and Fe, which are present as impurities, are limited to less than 0.1% and not more than 0.3%, respectively. Throughout the specification, all percentages are specified by weight unless otherwise indicated. The inventors have conducted various extensive studies on the erosion mechanism of a brazing filler metal in the core material and found that when the core material is not recrystallized during the brazing process and dislocated cells and subgrains, which have been formed during the press forming, are retained, erosion of the liquid brazing filler metal into the core material is caused. Based on such a finding, the inventors have further investigated to find how to easily induce the recrystallization of the core material and found that it is effective to control the particle sizes of Mn compounds such as Al-Mn, Al-Mn-Fe, Al-Mn-Si, Al-Mn-Fe-Si, etc, contained in the core material and to reduce the number of fine particles having a diameter of 0.1 μm or less. Also, it has been found that when the formation of fine Mn compounds is suppressed by controlling the content of Si as an impurity to less than 0.1%, press formability is improved. The present invention has been achieved based on such findings.

The present invention provides:

(1) An aluminum alloy clad material which is composed of:
(a) a core material made of an aluminum alloy consisting essentially of, in weight percentage, 0.3 to 1.5% manganese, 0.05 to 0.35% copper, 0.05 to 0.50% magnesium, 0.06 to 0.35% titanium, less than 0.1% silicon and up to 0.3% iron, with the proviso that the copper content is related to the magnesium content in accordance with the following equation:

$$Cu(\%)-0.2 \leq Mg(\%) \leq Cu(\%) +0.2,$$

the balance being aluminum and incidental impurities, and
(b) a cladding material made of an Si-containing aluminum alloy brazing filler material clad onto one or both sides of the core material.

(2) An aluminum alloy clad material which is composed of:
(a) a core material made of an aluminum alloy consisting essentially of, in weight percentage, 0.3 to 1.5% manganese, 0.05 to 0.35% copper, 0.05 to 0.50% magnesium, 0.06 to 0.35% titanium, less than 0.1% silicon and up to 0.3% iron, with the proviso that the copper content is related to the magnesium content in accordance with the following equation:

$$Cu(\%)-0.2 \leq Mg(\%) \leq Cu(\%) +0.2,$$

the balance being aluminum and incidental impurities, wherein the number of Mn compound particles having a diameter (equivalent diameter) of 0.1 μm or less is up to 35% of the total number of all Mn compound particles and the Ti content periodically varies along the thickness of the core material, and
(b) a cladding material made of an Si-containing aluminum alloy brazing filler material clad onto one or both sides of the core material.

In a further aspect, the present invention provides a heat exchanger comprising:
a fluid inlet tank into which a heat exchange fluid flows,
at least one tube connected the fluid entrance end thereof to the fluid inlet tank and allowing the heat exchange fluid to pass therethrough, the tube member being made of the above-specified aluminum alloy clad material (1) or (2),
a fluid outlet tank connected to a fluid exit end of the tube and thereby allowing the heat exchange fluid flowing from the tube to enter the fluid outlet tank, and
fins brazed onto the external surface of the tube.

The aluminum alloy clad material of the present invention is superior in press formability, pitting corrosion resistance and brazability over conventional materials. Therefore, when the clad material of the present invention is used in a heat exchanger, sufficient fillet thickness and configuration can be ensured at the brazed section of the brazing sheet and the burst pressure is also greatly increased. Further, since the clad material provides an improved corrosion resistance to a heat exchanger, the heat exchanger can maintain substantially improved performance characteristics over long periods of time. Due to these advantages, the thickness of the structural materials used in heat exchangers is substantially reduced and weight reduction becomes feasible.

DETAILED DESCRIPTION OF THE PREFERRED EMBODIMENTS

The reason why each component of the core material is limited to the aforesaid content range is described below. Mn: Mn provides not only an increased strength but also a high corrosion resistance. In addition, Mn makes the electrochemical potential of the core material noble and increases the potential difference between the core material and the brazing filler metal layer or between the core material and the fin material, thereby improving the corrosion protection effect due to the sacrificial anode action of the fin material. When the Mn content is less than 0.3%, the foregoing effects are not sufficient. On the other hand, when the Mn content exceeds 1.5%, coarse compounds are formed during casting, thereby introducing problems in the fabrication of sheets. Cu: Cu provides an increased strength and makes the potential of the core material more noble. Therefore, the core material exhibits a great potential difference over the brazing filler metal layer or the fin material, thereby improving the corrosion prevention effect by the sacrificial anode action of the fin material. Such an effect can be further increased when Cu is contained in coexistence with Mg. Amounts of Cu less than 0.05% are insufficiently effective to produce such effects, while amounts above 0.35% decrease the elongation of the resultant clad material and lead to deterioration in press formability. Mg: Mg provides an increased strength. Further, Mg in coexistence with copper improves the corrosion resistance of the core material. The reason for this effect is that Mg prevents segregation of Cu, such as precipitation of Cu along grain boundaries, thereby resulting in an improved corrosion resistance. Further, when Mg is coexistent with Cu, it makes the potential of the core material more noble and makes possible the attainment of a large potential difference between the core material and the fin material. As a result, the sacrificial anode effect of the fin material is enhanced. In general, the addition of Mg to an aluminum alloy renders the potential of the alloy less noble. However, it is considered that when Mg is contained in coexistence with Cu, it suppresses segregation of Cu, for example, precipitation of Cu along grain boundaries, and retains Cu in grains so that the amount of solid solution of Cu in the grains is increased during brazing and thereby the potential of the core material becomes more noble. When Mg is present in amounts less than 0.05%, these effects are not sufficient. On the other hand, Mg amounts of more than 0.50% results in a reduced elongation in the resultant clad material and cracking tends to occur during the press-forming operation.

The effectiveness of the Mg addition in improving corrosion resistance may be enhanced when Mg is contained in coexistence with Cu and the Mg content should fall within a range strictly controlled in relation to the Cu content. More specifically, the Mg content should satisfy the following relationship.

$$Cu(\%) - 0.2 \leq Mg(\%) \leq Cu(\%) + 0.2$$

When $Cu(\%) - 0.2 > Mg(\%)$, the Cu content becomes excessive relative to the Mg content and segregation of Cu occurs, thereby leading to a reduction in corrosion resistance. On the other hand, when $Mg(\%) > Cu(\%) + 0.2$, the Mg content is excessive relative to the Cu content and the potential of the core material lowers, thereby resulting in an insufficient sacrificial anode effect of the fin material. Ti: Ti distribution is separated into a high Ti content area and a low Ti content area along the sheet thickness of the core material and these two different areas are alternately arranged with a certain periodicity in a layered form. In such a periodically varying Ti content, corrosion proceeds in a layered form, because the low Ti content areas are preferentially corroded as compared with the high Ti content areas due to a galvanic action. Such a corrosion manner prevents the development of corrosion along the sheet thickness, thereby providing an improved pitting corrosion resistance. However, with a Ti content of less than 0.06%, the effect is not sufficient. On the other hand, a Ti content of over 0.35% presents difficulties in casting and lowers the formability. Therefore, sound materials can not be successfully produced. Si and Fe: These elements, which are present as impurities, reduce corrosion resistance. Further, an unacceptably high Si content increases the number of Mn compound particles with a fine size, thereby increasing the alloy's cracking tendency during press forming. Therefore, it is essential that Si and Fe should be below 0.1% and up to 0.3%, respectively. Mn compounds: Among Mn compounds contained in the core material (e.g., Al-Mn, Al-Mn-Fe, Al-Mn-Si, Al-Mn-Fe-Si, etc,), those having a diameter (equivalent diameter) of 0.1 μm or less exhibit a pinning action against dislocated cells and subgrains which have been induced by press forming, thereby suppressing recrystallization. When the percentage of the number of the Mn compound particles of 0.1 μm or less exceeds 35% of the total number of all Mn compound particles, the recrystallization prevention effect becomes strong and erosion by a brazing filler metal in a core material is drastically increased. Further, cracking during press-forming tends to occur. Therefore, the number of fine Mn compound particles of 0.1 μm or less should be up to 35% with respect to the total number of Mn compound particles. Ti content variations: The core material of the present invention has a structure in which the Ti content difference between a high Ti content area and a low Ti content area and the period width thereof are controlled. Due to such a structure, the corrosion morphology of the core material is like a layered form and the progress of corrosion along the thickness is blocked. Therefore, the pitting corrosion resistance of the core material is greatly improved. When the Ti content difference between the high Ti content area and the low Ti content area is less than 0.05%, any effective difference in electrochemical properties is not produced and the corrosion morphology becomes a pitting corrosion type. As a result, the pitting corrosion resistance is lowered. The period width of the above-mentioned Ti content variation is preferably from 2 μm to 50 μm. The term "period width" used for periodical Ti variations means the combined width of a low Ti content width and a high Ti content width along the thickness of the core material and a unit consisting of a low Ti content area and a high Ti content area are repeatedly layered with such a period width. When the period width is less than 2 μm or is more than 50 μm, the aforesaid layered-type corrosion can not be effectively developed and a sufficient effect of improving the pitting corrosion resistance can not be obtained.

Preferable processing conditions for the production of the above-mentioned material are as follows:

The cooling rate for casting the core material is an important factor in controlling the period width of the Ti content variations. For instance, when the cooling rate exceeds 100° C./sec, the period width can not be effectively adjusted. Whereas a cooling rate of under 0.1° C./sec provides a non-uniform periodicity in Ti content variation and results in a lowered pitting corrosion resistance.

The resultant cast ingot is homogenized and an Si-containing aluminum alloy brazing filler material is arranged as a cladding material on one or both sides of the homogenized material (as a core material). The composite material thus obtained is subjected to hot-rolling, cold rolling and final annealing operations to provide an aluminum alloy brazing sheet. When a core material with low contents of Si and Fe, as referred to the present invention, is produced in accordance to a conventional production line without any substantial modification, it is impossible to control the percentage of the number of Mn compounds having a diameter of not greater than 0.1 μm. Therefore, either the following procedure (1) or (2) should be employed. (1) In the above production process of the brazing sheet, homogenization is carried out at temperatures of 560° to 620° C. and the homogenized core material is held for 4 hours or more in total time at temperatures of 400° to 550° C. after the homogenization step but before the hot-rolling step. The "total time" specifically includes the duration at 400° to 550° C. in the steps of cooling down after homogenization and heating up and holding before the hot-rolling. (2) In the above production process of the brazing sheet, homogenization is carried out at temperatures of 560° to 620° C. and final annealing is carried out at a heating rate of not greater than 200° C./hour and at an annealing temperature of 350° to 500° C. for a annealing period defined in the following equation:

$$K_1 + K_2 \geq 45,$$

in which:

$$K_1 = t_1 \times 10^{11} \exp\left(-\frac{1.5 \times 10^4}{T_1}\right)$$

$$K_2 = t_2 \times 10^{11} \exp\left(-\frac{1.5 \times 10^4}{T_2}\right)$$

wherein:

$T_1$: annealing temperature (K)

$t_1$: holding time (hour) at the annealing temperature $T_1$ $T_2$: average temperature (K) of 623 K and the annealing temperature $T_1$, i.e., $T_2 = (623 + T_1) / 2$ $t_1$: duration (hour) in the temperature range of from 623 K to the annealing temperature $T_1$ in the course of the heating up and cooling down process of the annealing

EXAMPLE 1

18 different alloys having the respective compositions as shown in Table 1 below were melted and cast into ingots having a thickness of 175 mm and a width of 175 mm by a continuous casting process (cooling rate of 2° C./second). Each ingot was homogenized at 600° C. and cooled in such a manner that it was placed within a temperature range 400° to 550° C. for a period of 6 hours in the course of the cooling process. The homogenized material was longitudinally cut into a core material with a thickness of 21 mm, a width of 150 mm and a length of 150 mm. On the other hand, a brazing filler alloy 4104 (A1 - 10% Si - 1.5% Mg - 0.1% Bi) was similarly cast, faced and hot-rolled at a temperature of 480° C. to provide a cladding material with a thickness of 4.5 mm. The thus obtained cladding material was clad onto both sides of the core material and hot-rolled at 480° C. to provide a clad material with a thickness of 3 mm. Subsequently, the clad material was cold rolled to a sheet with a thickness of 0.6 mm and final-annealed at 380° C. to provide a brazing sheet suited for a core plate. In order to examine the particle diameter of Mn compounds contained in each core material of the brazing sheet, transmission electron micrographs (10000 magnification) were taken for five fields (total area: 200 $\mu m^2$) of each core material. The equivalent diameter distribution of the Mn compounds was analyzed by an image analysis system.

Further, the period width of the periodical Ti content differences of 0.05% or more was measured along the thickness of the core material through a Ti line analysis using an EPMA.

Figure 3:
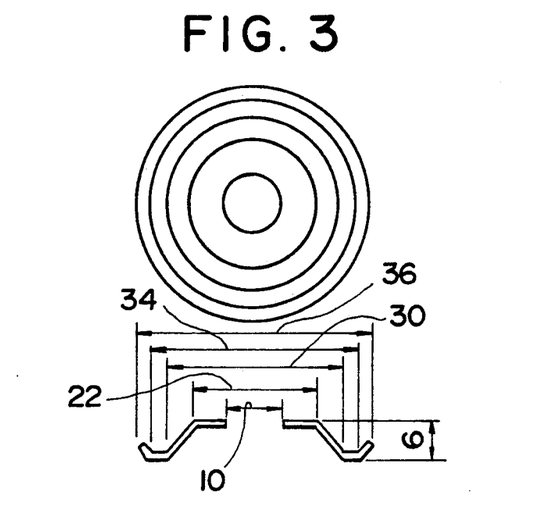
FIG. 3 is an illustration of the configuration of a press-formed material.
Figure 4:
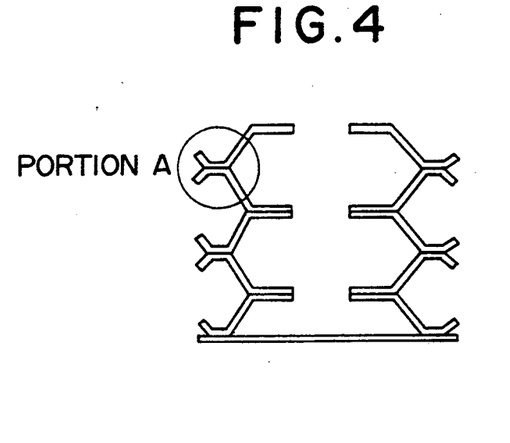
FIG. 4 is a sectional view of a stacked test assembly.

Next, specimens were cut from each core plate clad material (brazing sheet) and press-formed sheets as shown in FIG. 3 were obtained. Figures in FIG. 3 show the dimensions in millimeter units. The thus press-formed sheets were stacked up as shown in FIG. 4 and bonded together by vacuum brazing. The vacuum brazing was conducted at a temperature of 600° C. under a vacuum (pressure) of $5 \times 10^{-5}$ Torr or less, for a holding time of 3 minutes. Then, the fillet thickness (a - b) at the brazed joint section, as shown in FIG. 5, and the maximum erosion depth (c - d), as shown in the cross section of each clad material by an optical microscopy.

In order to evaluate the corrosion resistance of each material, a CASS Test (JIS D0201) was carried out for a period of one month for each brazed assembly as shown in FIG. 4 and the maximum depth of the resultant pitting corrosion was measured. A tensile test was conducted for the materials after vacuum brazing as set forth above as well as the clad materials per se (raw materials). The test results are shown in Table 2.

TABLE 1

| No. | Al | Mn | Cu | Mg | Ti | Si | Fe |
|---|---|---|---|---|---|---|---|
| 1 | Bal | 0.33 | 0.34 | 0.46 | 0.08 | 0.04 | 0.27 |
| 2 | Bal | 0.80 | 0.15 | 0.09 | 0.32 | 0.05 | 0.10 |
| 3 | Bal | 1.21 | 0.17 | 0.21 | 0.16 | 0.09 | 0.18 |
| 4 | Bal | 1.48 | 0.07 | 0.25 | 0.11 | 0.08 | 0.20 |
| 5 | Bal | 1.00 | 0.31 | 0.20 | 0.20 | 0.09 | 0.22 |
| 6 | Bal | 1.15 | 0.20 | 0.36 | 0.15 | 0.08 | 0.19 |
| 7 | Bal | 0.20 | 0.15 | 0.20 | 0.24 | 0.09 | 0.19 |
| 8 | Bal | 1.88 | 0.21 | 0.20 | 0.15 | 0.08 | 0.20 |
| 9 | Bal | 1.21 | 0.02 | 0.28 | 0.09 | 0.07 | 0.21 |
| 10 | Bal | 1.25 | 0.45 | 0.29 | 0.18 | 0.07 | 0.20 |
| 11 | Bal | 1.22 | 0.16 | 0.03 | 0.11 | 0.06 | 0.25 |
| 12 | Bal | 1.23 | 0.23 | 0.56 | 0.18 | 0.07 | 0.19 |
| 13 | Bal | 1.20 | 0.15 | 0.40 | 0.10 | 0.08 | 0.22 |
| 14 | Bal | 1.15 | 0.32 | 0.08 | 0.15 | 0.08 | 0.25 |
| 15 | Bal | 1.20 | 0.20 | 0.20 | 0.02 | 0.07 | 0.22 |
| 16 | Bal | 1.21 | 0.15 | 0.29 | 0.44 | 0.08 | 0.20 |
| 17 | Bal | 1.20 | 0.23 | 0.20 | 0.10 | 0.19 | 0.24 |
| 18 | Bal | 1.21 | 0.15 | 0.11 | 0.10 | 0.06 | 0.48 | note:
Nos. 1-6: Alloys of the Invention
Nos. 7-18: Comparative alloys

TABLE 2

| No. | Percentage of compound particles of 0.1 μm or less (%) | Period width of Ti content variations (μm) | Max. erosion depth (μm) | Fillet thickness (mm) | Maximum pitting corrosion depth after Cass test (mm) | Mechanical properties of raw material | | Ultimate tensile strength after vacuum brazing (kgf/mm²) |
|---|---|---|---|---|---|---|---|---|
| | | | | | | Ultimate tensile strength (kgf/mm²) | Elongation (%) | |
| 1 | 20 | 15 | 50 | 1.5 | 0.16 | 14 | 29 | 13 |
| 2 | 19 | 6 | 70 | 1.4 | 0.14 | 12 | 33 | 13 |
| 3 | 17 | 8 | 100 | 1.3 | 0.15 | 14 | 29 | 13 |
| 4 | 22 | 19 | 90 | 1.3 | 0.15 | 14 | 30 | 14 |
| 5 | 20 | 11 | 80 | 1.4 | 0.13 | 15 | 28 | 14 |
| 6 | 19 | 14 | 80 | 1.3 | 0.10 | 15 | 27 | 15 |
| 7 | 22 | 10 | 100 | 1.3 | 0.21 | 12 | 32 | 11 |
| 8 | — | — | — | — | — | — | — | — |
| 9 | 20 | 15 | 90 | 1.4 | 0.23 | 12 | 31 | 12 |
| 10 | 23 | 12 | 110 | 1.3 | 0.27 | 16 | 20 | 16 |
| 11 | 16 | 20 | 70 | 1.4 | 0.29 | 13 | 33 | 12 |
| 12 | 23 | 14 | 100 | 1.3 | 0.34 | 16 | 23 | 16 |
| 13 | 20 | 12 | 90 | 1.4 | 0.32 | 15 | 28 | 15 |
| 14 | 21 | 17 | 80 | 1.4 | 0.30 | 15 | 29 | 14 |
| 15 | 19 | — | 70 | 1.4 | 0.26 | 15 | 29 | 14 |
| 16 | — | — | — | — | — | — | — | — |

TABLE 2-continued

| No. | Percentage of compound particles of 0.1 μm or less (%) | Period width of Ti content variations (μm) | Max. erosion depth (μm) | Fillet thickness (mm) | Maximum pitting corrosion depth after Cass test (mm) | Mechanical properties of raw material | | Ultimate tensile strength after vacuum brazing (kgf/mm²) |
|---|---|---|---|---|---|---|---|---|
| | | | | | | Ultimate tensile strength (kgf/mm²) | Elongation (%) | |
| 17 | 16 | 20 | 60 | 1.4 | 0.17 | 15 | 24 | 15 |
| 18 | 16 | 21 | 70 | 1.4 | 0.41 | 14 | 30 | 13 |

In the case of the invention Examples of Nos. 1 to 6, the percentages of Mn compound particles of not greater than 0.1 μm was not more than 22% and the period width of Ti content variations was from 6 to 19 μm. Since these examples were small in maximum erosion depth, a sufficiently large fillet thickness was obtained. Further, the invention examples all exhibited low levels of the maximum pitting corrosion depths not exceeding 0.16 mm after the CASS Test, large elongation values of 27% or more and high tensile strength levels of not less than 13 kgf/mm² after the vacuum brazing.

Comparative Example No. 7 showed a somewhat high degree of maximum pitting corrosion depth and an inadequate tensile strength level after the vacuum brazing, due to an insufficient Mn content.

No. 8 did not provide a sound clad material because of an excessive Mn content.

No. 9 exhibited a large maximum pitting corrosion depth and a somewhat low tensile strength after the vacuum brazing, because of a low Cu content.

Due to an excessive Cu content, No. 10 showed a high degree of maximum pitting corrosion depth and the raw material exhibited a low elongation and a poor press-formability.

No. 11 exhibited a large maximum pitting corrosion depth and the tensile strength after vacuum brazing was somewhat low, due to an inadequate Mg content.

No. 12 showed a high degree of maximum pitting corrosion depth and an insufficient elongation, due to an excessive Mg content.

Nos. 13 and 14 both exhibited large maximum pitting corrosion depths because the equation $Cu - 0.2 \leq Mg \leq Cu + 0.2$ was not satisfied.

No. 15 exhibited a large maximum pitting corrosion depth due to an insufficient Ti content.

No. 16 did not provide a sound clad material because of an excessive Ti content.

No. 17 was insufficient in elongation because of an excessive Si content.

No. 18 exhibited a large maximum pitting corrosion depth due to an excessive Fe content.

EXAMPLE 2

Using the core material alloys of Nos. 1, 2 and 4 shown in the Table 1, 0.6 mm-thick clad materials (brazing sheets) were fabricated in the same production line as set forth in Example 1. The fabrication conditions are given in Table 3. In accordance to the same manner as set forth in Example 1, the percentage of Mn compound particles having a diameter of 0.1 μm or less, period width of Ti content variations, maximum depth of erosion by the brazing filler material, fillet thickness and maximum pitting corrosion depth after the CASS Test were measured for each specimen. The test results are shown in the Table 4.

In the case of Examples numbered 1A, 1B, 2A, 2B, 4A and 4B according to the present invention, the number of Mn compound particles not exceeding 0.1 μm in diameter was not more than 24% of the total number of all Mn compound particles and the period width of Ti content variations was in the range of 5 to 17 μm. Further, these Examples showed a low level of maximum erosion depth of not greater than 90 μm, a large fillet thickness of 1.3 mm or more and a small level of maximum pitting corrosion depth of not greater than 0.16 mm.

Comparative Examples Nos. 1C, 2C and 4C exhibited large period widths of Ti content variations because the cooling rates in the casting step were low.

Whereas the cooling rates of Nos. 1D, 2D, and 4D in the casting step were too large and, therefore, the period widths of Ti content variations became narrow and the maximum pitting corrosion depths were somewhat large.

Further, the homogenizing temperatures of Nos. 1E, 2E and 4E were low and the homogenizing temperatures of Nos. 1F, 2F and 4F were high. Further, in the case of Nos. 1G, 2G and 4G, the duration in the temperature range of 400° to 550° C. between the homogenizing step and the hot-rolling step was shorter than 4 hours and the values of $K_1 + K_2$ in the final annealing step was less than 45. Due to such unacceptable conditions, the number of Mn compound particles of 0.1 μm or less in these comparative examples exceeded 35% of the total number of all Mn compound particles and the maximum erosion depths by the brazing filler metals became large with an insufficient fillet thickness.

Such a high degree of attack by the brazing filler metal resulted in a drastically increased maximum pitting corrosion depth.

TABLE 3

| No. | Cooling rate of casting core material (°C./sec) | Homogenizing temp. (°C.) | Duration* (h) | Final annealing | | | | |
|---|---|---|---|---|---|---|---|---|
| | | | | Temp. (°C.) | Holding time (h) | Heating rate (°C./h) | $t_2$ | $K_1 + K_2$ |
| A | 5 | 590 | 12 | 365 | 3 | 50 | 4 | 37 |
| B | 5 | 590 | 3 | 400 | 10 | 10 | 6 | 262 |
| C | 0.05 | 590 | 3 | 400 | 10 | 10 | 6 | 262 |
| D | 500 | 590 | 3 | 400 | 10 | 10 | 6 | 262 |
| E | 5 | 520 | 3 | 400 | 10 | 10 | 6 | 262 |
| F | 5 | 630 | 3 | 400 | 10 | 10 | 6 | 262 |

TABLE 3-continued

| No. | Cooling rate of casting core material (°C./sec) | Homogenizing temp. (°C.) | Duration* (h) | Final annealing Temp. (°C.) | Holding time (h) | Heating rate (°C./h) | $t_2$ | $K_1 + K_2$ |
|---|---|---|---|---|---|---|---|---|
| G | 5 | 590 | 3 | 365 | 3 | 50 | 4 | 37 |

*Duration at 400 to 550° C. between homogenization and hot-rolling

TABLE 4

| No. | Core material alloy No. | Fabrication conditions | Percentage of compound particles of 0.1 μm or less (%) | Period width of Ti content variations (μm) | Max. erosion depth (μm) | Fillet thickness (mm) | Max. pitting corrosion depth after Cass test (mm) |
|---|---|---|---|---|---|---|---|
| 1A | 1 | A | 23 | 12 | 50 | 1.4 | 0.15 |
| 1B | 1 | B | 20 | 14 | 60 | 1.4 | 0.16 |
| 1C | 1 | C | 16 | 80 | 60 | 1.4 | 0.21 |
| 1D | 1 | D | 23 | 1 | 50 | 1.4 | 0.24 |
| 1E | 1 | E | 56 | 12 | 230 | 0.8 | 0.20 |
| 1F | 1 | F | 45 | 13 | 200 | 0.8 | 0.24 |
| 1G | 1 | G | 48 | 12 | 240 | 0.7 | 0.23 |
| 2A | 2 | A | 20 | 7 | 60 | 1.4 | 0.13 |
| 2B | 2 | B | 19 | 5 | 70 | 1.4 | 0.12 |
| 2C | 2 | C | 17 | 80 | 80 | 1.3 | 0.24 |
| 2D | 2 | D | 22 | 0.6 | 80 | 1.4 | 0.23 |
| 2E | 2 | E | 60 | 9 | 320 | 0.6 | 0.25 |
| 2F | 2 | F | 40 | 9 | 270 | 0.7 | 0.26 |
| 2G | 2 | G | 46 | 8 | 330 | 0.5 | 0.30 |
| 4A | 4 | A | 22 | 17 | 90 | 1.3 | 0.14 |
| 4B | 4 | B | 24 | 16 | 80 | 1.4 | 0.15 |
| 4C | 4 | C | 20 | 90 | 100 | 1.3 | 0.25 |
| 4D | 4 | D | 24 | 1 | 90 | 1.3 | 0.23 |
| 4E | 4 | E | 61 | 16 | 370 | 0.4 | 0.38 |
| 4F | 4 | F | 47 | 18 | 310 | 0.5 | 0.29 |
| 4G | 4 | G | 50 | 15 | 350 | 0.4 | 0.31 |

Remark
1A, 1B, 2A, 2B, 4A, 4B: the Invention
1C, 1D, 1E, 1F, 1G, 2C, 2D, 2E, 2F, 2G, 4C, 4D, 4E, 4F, 4G: Comparative Examples

What is claimed is:

1. An aluminum alloy clad material which is composed of:
   (a) a core material made of an aluminum alloy consisting of, in weight percentage, 0.3 to 1.5% manganese, 0.05 to 0.35% copper, 0.05 to 0.50% magnesium, 0.06 to 0.35% titanium, the Ti content periodically varying along the thickness of the core material with a period width of Ti content variation of from 2 μm to 50 μm, less than 0.1% silicon and up to 0.3% iron, with the proviso that the copper content is related to the magnesium content in accordance with the following equation:

$$Cu(\%) - 0.2 \leq Mg(\%) \leq Cu(\%) + 0.2,$$

the balance being aluminum and incidental impurities and
   (b) a cladding material made of an Si-containing aluminum alloy brazing filler material clad onto one or both sides of said core material.

2. An aluminum alloy clad material which is composed of:
   (a) a core material made of an aluminum alloy consisting of, in weight percentages, 0.3 to 1.5% manganese, 0.05 to 0.35% copper, 0.05 to 0.50% magnesium, 0.06 to 0.35% titanium, less than 0.1% silicon and up to 0.3% iron, with the proviso that the copper content is related to the magnesium content in accordance with the following equation:

$$Cu(\%) - 0.2 \leq Mg(\%) \leq Cu(\%) + 0.2,$$

the balance being aluminum and incidental impurities, wherein the number of Mn compound particles having a diameter (equivalent diameter) of 0.1 μm or less is up to 35% of the total number of all Mn compound particles and the Ti content periodically varies along the thickness of said core material with a period width of Ti content variation of from 2 to 50 μm, and
   (b) a cladding material made of an Si-containing aluminum alloy brazing filler material clad onto one or both sides of said core material.

3. A heat exchanger comprising:
   a fluid inlet tank into which a heat exchange fluid flows,
   at least one tube connected at a fluid entrance end thereof to said fluid inlet tank and allowing said heat exchange fluid to pass therethrough,
   a fluid outlet tank connected to a fluid exit end of said tube and thereby allowing said heat exchange fluid flowing from said tube to enter said fluid outlet tank, and
   fins brazed onto an external surface of said tube, wherein said tube is made of an aluminum alloy clad material which is composed of:
   (a) a core material made of an aluminum alloy consisting of, in weight percentage, 0.3 to 1.5% manganese, 0.05 to 0.35% copper, 0.05 to 0.50% magnesium, 0.06 to 0.35% titanium, the Ti content periodically varying along the thickness of the core material with a period width of Ti content variation of from 2 μm to 50 μm, less than 0.1% silicon and up to 0.3% iron, with the proviso that the copper content is related to the magnesium content in accordance with the following equation:

$$Cu(\%) - 0.2 \leq Mg(\%) \leq Cu(\%) + 0.2.$$

the balance being aluminum and incidental impurities and (b) a cladding material made of an Si-containing aluminum alloy brazing filler material clad onto one or both sides of said core material.

4. A heat exchanger comprising:

a fluid inlet tank into which a heat exchange fluid flows, at least one tube connected at a fluid entrance end thereof to said fluid inlet tank and allowing said heat exchange fluid to pass therethrough, a fluid outlet tank connected to a fluid exit end of said tube and thereby allowing said heat exchange fluid flowing from said tube to enter said fluid outlet tank, and fins brazed onto an external surface of said tube, wherein said tube is made of an aluminum alloy clad material which is composed of:

(a) a core material made of an aluminum alloy consisting of, in weight percentages, 0.3 to 1.5% manganese, 0.05 to 0.35% copper, 0.05 to 0.50% magnesium, 0.06 to 0.35% titanium, less than 0.1% silicon and up to 0.3% iron, with the proviso that the copper content is related to the magnesium content in accordance with the following equation:

$$Cu(\%) - 0.2 \leq Mg(\%) \leq Cu(\%) + 0.2,$$

the balance being aluminum and incidental impurities, wherein the number of Mn compound particles having a diameter (equivalent diameter) of 0.1 $\mu$m or less is up to 35% of the total number of all Mn compound particles and the Ti content periodically varies along the thickness of said core material with a period width of Ti content variation of from 2 to 50 $\mu$m, and (b) a cladding material made of an Si-containing aluminum alloy brazing filler material clad onto one or both sides of said core material.

* * * * *